Nov. 13, 1962 W. J. WILKINS 3,063,244
VEHICLE STEERING MECHANISM
Filed June 14, 1960 5 Sheets-Sheet 1

INVENTOR
Walter J. Wilkins

BY Mason, Fenwick & Lawrence
ATTORNEYS

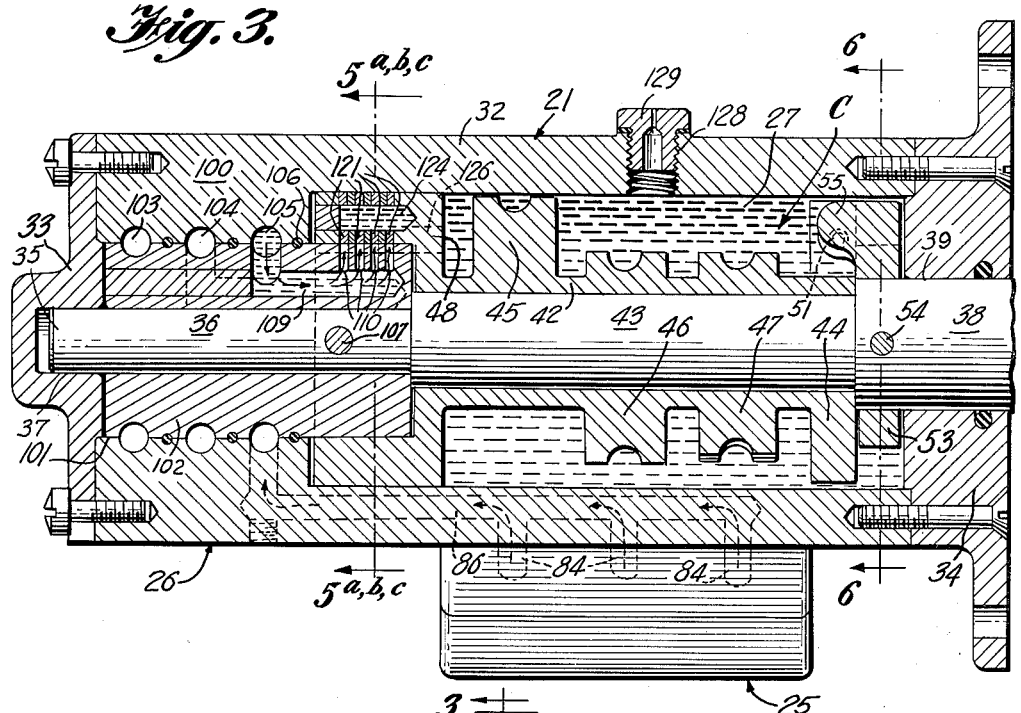

Nov. 13, 1962 W. J. WILKINS 3,063,244
VEHICLE STEERING MECHANISM
Filed June 14, 1960 5 Sheets-Sheet 3

INVENTOR
Walter J. Wilkins

BY Mason, Fenwick & Lawrence
ATTORNEYS

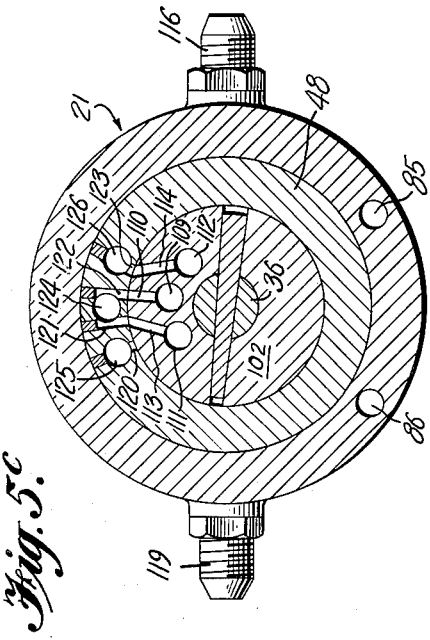

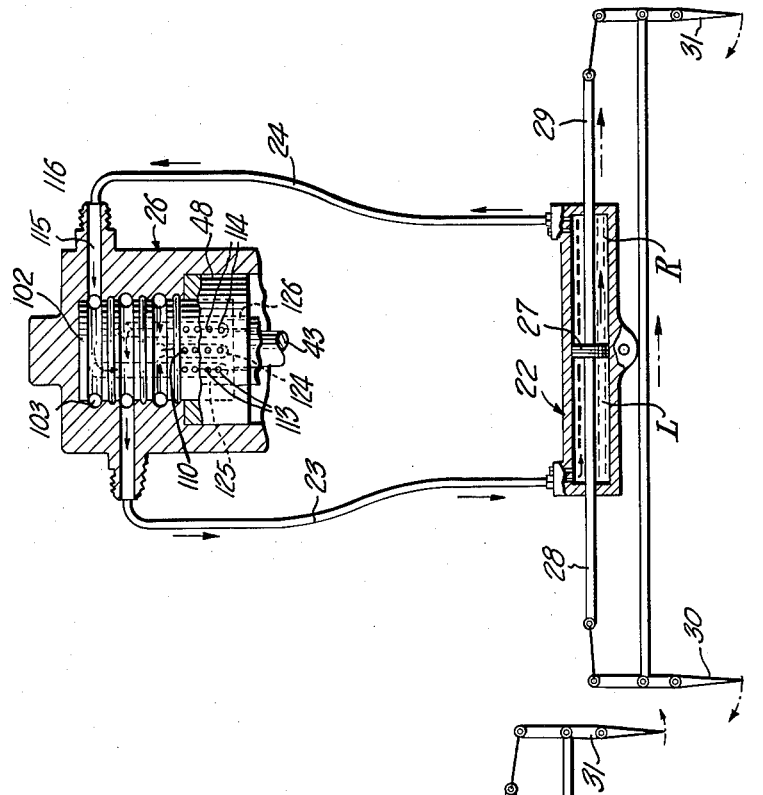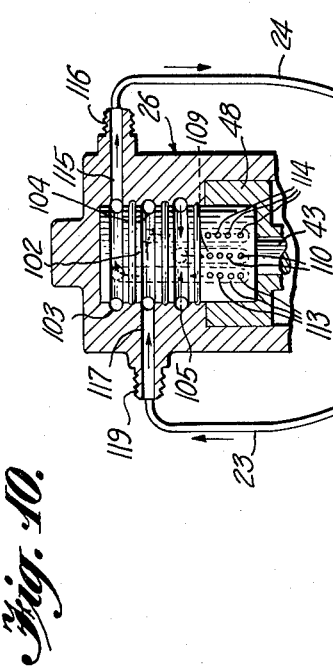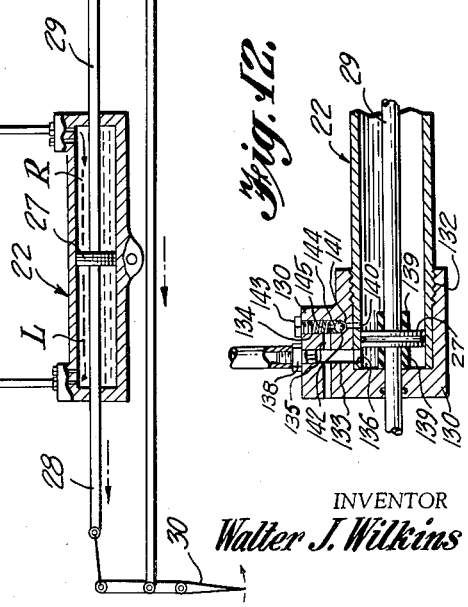

United States Patent Office 3,063,244
Patented Nov. 13, 1962

1

3,063,244
VEHICLE STEERING MECHANISM
Walter J. Wilkins, 1500 Monticello Ave., Norfolk, Va.
Filed June 14, 1960, Ser. No. 35,962
7 Claims. (Cl. 60—52)

This invention relates to vehicle steering apparatus and more particularly to manually powered hydraulic steering system and motor therefor.

Attempts have been made in the past to provide manually powered hydraulic steering motors. These attempts have taken such form as a driver piston being moved in one cylinder to obtain a similar movement of a driven piston in another cylinder through hydraulic medium transfer. In such devices the driver piston is connected to the steering wheel and the articulated steering leverage is connected to the driven piston. Due to seepage of fluid past one or both pistons, frequent adjustments are required to maintain the driven piston in alignment with the driver piston.

Consequently, it is an object of the present invention to provide a manually powered hydraulic steering system in which the steering wheel is always in alignment with the steering ram.

It is another object of the present invention to provide such a steering system in which the steering ram is locked against movement when the steering wheel is at rest.

A further object of the present invention is to provide a steering system consisting of a manually powered hydraulic motor having a unidirectional flow and a torque operated valve means to conduct the flow of the hydraulic medium to and from selected sides of the hydraulic steering ram when the steering wheel is under turning torque and the steering ram is locked against movement when the steering wheel is at rest.

Other objects and advantages of the present invention will become apparent to those skilled in the art, from the following description when read in conjunction with the accompanying drawing, wherein:

FIGURE 2 is a cross-sectional view of the steering motor, taken on the line 2—2 of FIGURE 1;

FIGURE 3 is a vertical longitudinal sectional view taken on the line 3—3 of FIGURE 2;

FIGURES 5a, 5b and 5c are vertical sectional views taken along the line 5—5 of FIGURE 3, showing the valve position for locked position, right turning and left turning positions, respectively;

FIGURE 6 is a vertical transverse sectional view taken on the line 6—6 of FIGURE 3, showing the biasing means for locking the system when there is no turning torque imposed on the steering wheel;

FIGURES 10 and 11 are diagrammatic horizontal sectional views through the torque valve and steering ram, illustrating the flow of hydraulic fluid to effect a right turn and left turn, respectively;

FIGURE 12 is a fragmentary sectional view through the end cap of a modified ram cylinder showing a pressure release means.

Figure 1:
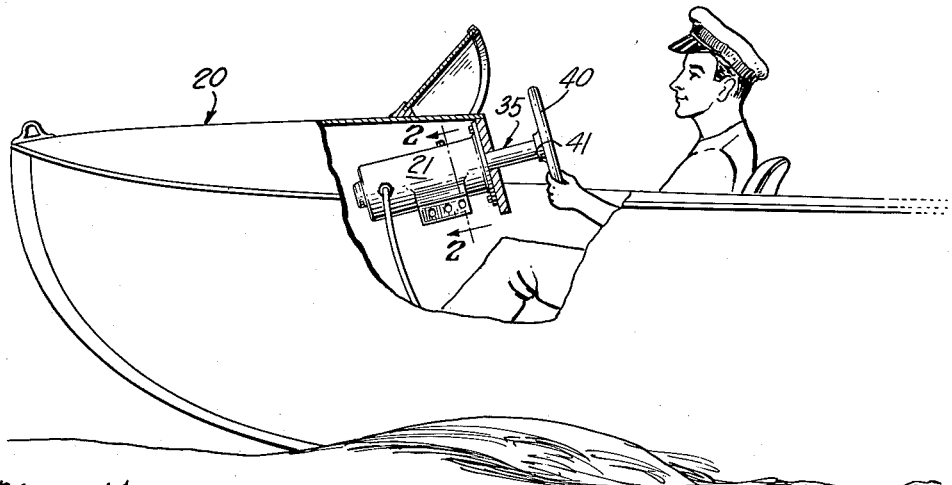
FIGURE 1 is a partial side elevation of a vehicle employing the manually powered hydraulic steering system of the presents invention, parts having been broken away to show the steering motor of the system.
Figure 7:
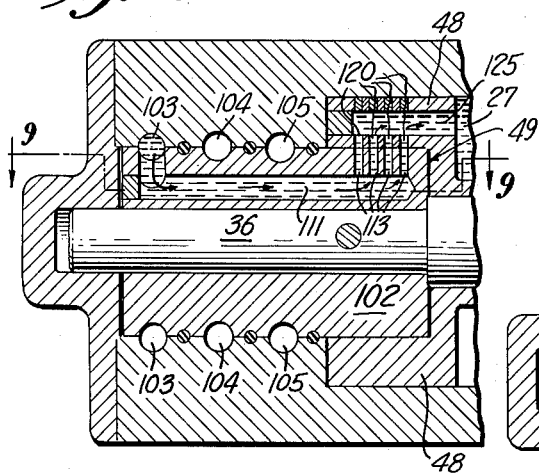
FIGURES 7 and 8 are fragmentary vertical sectional views through a portion of the valve shown in FIGURE 3, showing a pair of the collector conduits and associated valve ports.
Figure 8:
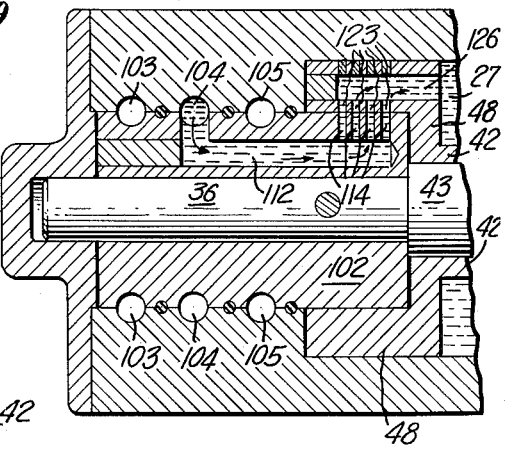
Figure 9:
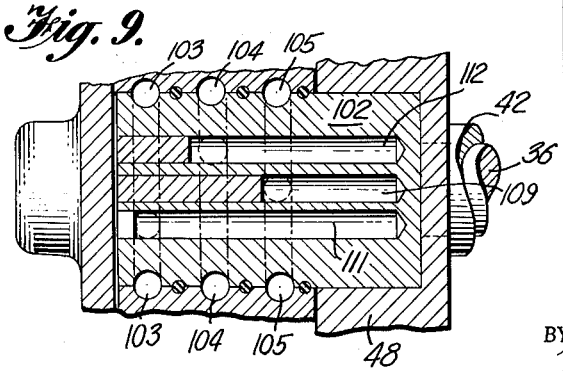
FIGURE 9 is a fragmentary horizontal sectional view taken on the line 9—9 of FIGURE 7.

The present invention will be described with respect to

2 a steering motor and system for boats, but it will be recognized by those skilled in the art that the motor and system of the present invention can be used for steering other vehicles such as automobiles, airplanes and the like.

Adverting now to the drawing, and particularly FIGURES 1, 2, 10 and 11, there is shown at 20 a boat having a steering unit 21 of the present invention, and steering motor 22, to which are connected the hydraulic lines or conduits 23, 24. The steering unit 21 comprises a pumping portion 25 and a distribution and valving portion 26.

The steering motor 22 is provided with a reciprocable piston 27, having the piston rods 28, 29 connected to the rudders 30, 31, respectively.

In general, the steering unit 21 pumps hydraulic fluid from a reservoir when the steering wheel is turned. The flow of fluid is in one and the same direction through the pump cylinders, regardless of whether the steering wheel is revolved to the right or left. The flow of fluid under pressure to one side or the other of piston 27, and return of fluid from the opposite side of the piston to the reservoir is controlled by the turning torque applied to the steering wheel. When the steering wheel is at rest, the system is locked, so that no fluid can flow into or out of the motor 22, but when the steering wheel is turned, the ports of the valve portion are immediately aligned to direct the fluid under pressure to that side of the ram piston 27 which will move the rudders in the direction to turn the boat in accordance with the direction in which the steering wheel is revolved.

More particularly, the steering unit 21 comprises a housing 32, having the end closure plates 33, 34 in which there is journaled a stepped diameter shaft 35 having steps of three different diameters, the smaller diameter 36 of the shaft 35 being journaled in the bearing 37 of end plate 33, and the larger diameter 38 of the shaft 35 being journaled in the bearing 39 of end plate 34. A steering wheel 40 is mounted on the outwardly extending end 41 of the shaft 35. A cam sleeve 42 is mounted on the intermediate diameter step 43 of the shaft 35. The cam sleeve 42 is revoluble relative to the shaft 35 within limits soon to be explained.

The cam sleeve 42 comprises a torque receptor 44, a plurality of cams 45, 46, 47 and a porting portion 48 for the distributor valve 49. The torque receptor 44 is provided with a radially extending slot 50, the sides of the slot 50 being bored to receive the compression springs 51, 52.

A torque applicator 53 is keyed to the step 38 of shaft 35 by means of a radially extending pin 54. As seen in FIGURE 3, the torque applicator 53 has an outstanding ear portion 55 which meshes in the slot 50, the ear 55 being smaller than the slot 50. The sides of the ear portion 55 are bored to receive the other ends of the springs 51, 52. When the steering wheel 40 is turned to the right, the bias of spring 52 must first be overcome before the cam sleeve moves. Similarly, when the wheel 40 is turned to the left, the bias of spring 51, as seen in FIGURE 6, must first be overcome before the cam sleeve moves.

Figure 4:
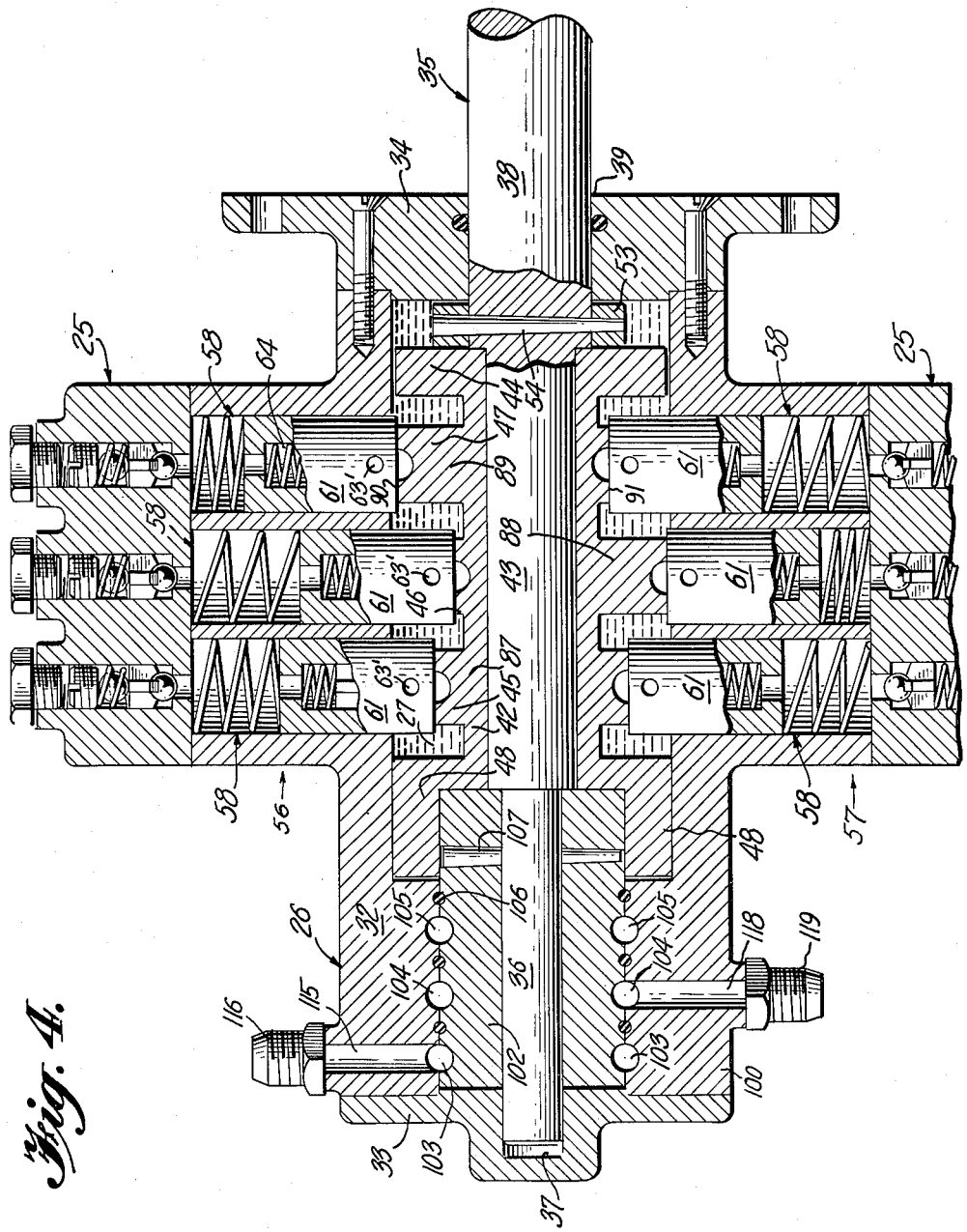
FIGURE 4 is a horizontal sectional view taken on the line 4—4 of FIGURE 2.

The embodiment used for illustrating the invention, as seen in FIGURE 4, has two banks 56, 57 of three pumps 58 each. Of course, it will be realized that the invention may be practiced with a different number of banks of pumps with a different number of pumps per bank. Each of the pumps 58 is similar to each of the other pumps, and the description of one will apply to all.

The pump 58 is provided with a cylinder bore 59 in a block 60. A piston 61 is mounted in the cylinder 59 and biased outwardly toward the reservoir C by a compression spring 62 seated in the end of the cylinder. The piston 61 is radially bored to provide a plurality of inlet orifices 63 spaced annularly around the piston and spaced from the end thereof, as seen in FIGURE 2.

The piston 61 has an axial bore 64 extending from its intersection with the bores 63 to the outlet end 65 of the piston, to provide a valve chamber 66 and an outlet orifice 67.

The inlet orifice section 68 may be conveniently attached to the main body of the piston 61 by means of a valve sleeve insert 69. The valve sleeve insert 69 has a seat 70 which is valved by a ball 71 held in alignment by an axially slidable carrier 72 having vanes 73 and a central bore 73'. Liquid which is forced through the seat 70 will pass around the ball 71 and between the vanes 72 into the central bore 73'. A compression spring 74 biases the ball carrier 72 and ball 71 toward its seat 70. A cylinder head 75 having an axial bore 75a closes the end of the cylinder 59 and is provided with a passage 76 having a seat 77 valved by a ball 78 mounted in a carrier 79 which is similar to the carrier 72. The ball 78 is biased toward its seat by means of a compression spring 80 mounted in a retainer 81 threadedly received in the bore 75a. A plug 82 is also threadedly received in the bore 75a to provide a liquid tight seal for the bore. A passage 83 intersects the bore 75a and connects with a branch passage 84, which in turn leads to a main collector conduit 85 which collects from all of the pumps in a bank of pumps. The conduit 85, together with a conduit 86, conduct the fluid under pressure to the valving portion 26.

As best seen in FIGURES 2 and 4, the cam sleeve 42 has three cams 45, 46 and 47, each of which has a high point 90 and low point 91, fixed 120° apart in the case of a motor having three pumps in a bank. When the low point 91 is in contact with a piston 61, the inlet orifice 63 extends into the reservoir C so that hydraulic fluid will enter the bore 92 of valve sleeve insert 69. When the high point 90 of the cam engages the piston 61 the latter is forced into the cylinder 59, and fluid in the compression section 93 of the cylinder 59 is compressed and forced past ball 78 into conduits 84 and 85. When the high point 90 of the cam has passed, the piston 61 is biased outwardly into the reservoir, and fluid enters the inlet orifices to fill the bore 92 and section 93. This pumping action takes place regardless of the direction in which the steering wheel 40 is turned.

The valving portion 26 comprises a housing portion 100 having a bore 101 in which there is mounted a barrel portion 102 having three spaced annular conduits 103, 104 and 105 formed by aligned hemispherical grooves in the barrel and housing, respectively. Each of the annular conduits is sealed against leakage into one of the other conduits by means of annular seals as at 106. The barrel portion 102 is keyed to the step portion 36 of shaft 35 by a pin 107.

The cam sleeve 42 has an outwardly extending porting portion 48 which overlies and embraces a portion of the barrel 102. An internal conduit 109 extending longitudinally of the barrel 102 places the annular conduit 105 at one end of the conduit 109 in fluid communication with a bank of orifice passages 110. A bank of small passages are provided to equal the flow of the conduit 109. Internal conduits 111 and 112 also extending longitudinally of the barrel 102 and spaced from the conduit 109 place the annular conduits 103 and 104 at one of the respective ends of the conduits 111 and 112 in communication with the banks of orifices 113 and 114, respectively.

As seen in FIGURE 4, the housing portion 100 is provided with a passage 115 which places the annular conduit 103 in communication with a line connector 116, and also with a passage 118 which places the annular conduit 104 in communication with a line connector 119. Pipeline 24 is connected to the line connector 116 to place right side R of the motor 22 in communication with the steering unit, and pipeline 23 is connected to the line connector 119 to place the left side L of the motor 22 (see FIGURES 10 and 11), in communication with the steering unit.

To transfer fluid pressure from the pressure lines 85, 86 to the respective sides of the motor 22, as desired, and to return the fluid from the other side of the motor 22 to the reservoir C, four banks of orifice passages 120, 121, 122 and 123 are provided in the extension 48 of the cam sleeve 42. The orifice passages 120, 121, 122 and 123 are so spaced that the orifice passages 113, 110 and 114 will in a neutral position lie intermediate of the passages 120, 121, 122 and 123, but the turning of the steering wheel and shaft 35 a few degrees in one direction with respect to the cam sleeve 42 will cause registry orifice passages 113, 110 and 114 with the orifice passages 121, 122 and 123, and turning the shaft 35 a few degrees in the opposite direction with respect to the cam sleeve 47, will align the orifice passages 113, 110 and 114 with the orifice passages 120, 121 and 122.

The orifice passages 121 and 122 are placed in communication by a transfer chamber 124. The orifice passages 120 are in communication with a return conduit 125 which opens into the reservoir C, and likewise, the orifice passages 123 are in communication with a return conduit 126, which also opens into the reservoir C.

In operation, the system is filled with any suitable hydraulic fluid by pouring it in the filler opening 128 in housing 32 after removal of a cap 129. The reservoir C is filled with the fluid, and the steering wheel is turned first in one direction and then the other, to fill the lines 23 and 24, and the motor 22 with the fluid and expel the air. The cap 29 is then replaced.

When the steering wheel 40 is at rest, that is to say, no turning torque is being applied to it, the torque applicator 53 is centered in the slot 50 of the torque receptor, as seen in FIGURE 6. Also, the orifice passages 110, 113, 114 and 120, 121, 122, 123 of the valving portion 26 are out of alignment, as seen in FIGURE 5a, and the system is locked in, so that there can be no flow of fluid through the system. If the boat is to be turned to the right, as by pressurizing the R side of the motor 22, as seen in FIGURE 10 with fluid under pressure and expelling fluid from the L side of the motor 22, the steering wheel 40 is revolved to the right. The first few degrees of arc through which the shaft 35 is turned will cause the torque applicator keyed to the shaft 35, and with it the barrel 102 which is also keyed to the shaft 35, to move relative to the torque receptor 44 and the extension 48 until the space X, as seen in FIGURE 6, is closed and then the cam sleeve 42 moves with the shaft 35. During the initial movement of the shaft 35 relative to the cam sleeve 42, the orifice passages 113, 110, 114 in barrel 102 and 121, 122, 123 in the extension 48 are aligned, as seen in FIGURE 5c. Further revolution of the shaft 35 causes the cams on the cam sleeve 42 to reciprocate the pistons 61 and pump fluid from the reservoir C into the pressure lines 85, 86 and thence to the annular conduit 105 through the barrel conduit 109, the orifice passages 110, the orifice passages 122, the transfer chamber 124, the orifice passage 121, the orifice passage 113, the conduit 111, the annular conduit 103, passageway 115, pipeline 24, to place the R side of motor 22 under pressure and force piston 27 to the left and turn rudders 30, 31 to steer the boat to the right. Fluid in the L side of motor 22 is forced from the motor through line 23 and passageway 117, annular conduit 104, conduit 112, orifice passageway 114, registering orifice passageways 123, conduit 126 to reservoir C. As long as steering wheel 40 is turned to the right, the alignment of the orifice passageways will remain the same and pumping of fluid into the R side of motor 22 will continue until the piston 27 has been moved to its limit of movement in the ram cylinder. As soon as movement of the steering wheel ceases, the spring 52 will center the torque applicator 53 in the torque receptor slot 50 and all of the orifice passages 110, 113, 114 and 120, 121, 122, 123 will be closed, as seen in FIGURE 5a, and the rudders 30, 31 are locked against movement by water pressure.

To pressurize the L side of motor 22 and turn the boat to the left, the steering wheel 40 and shaft 35 to which it is keyed are turned to the left. Initial movement of the shaft 35 causes the torque applicator 53 to move to the left, as seen in FIGURE 6, and compress the spring 51, thereby closing the space indicated at Y. The barrel 102 also moves relative to the porting extension 48 and the orifice passages 113, 110, 114 and 120, 121, 122 are aligned, as seen in FIGURE 5b. Further turning to the left operates the pump pistons 61 to force fluid from the reservoir into passages 83, branch passage 84 and main collector conduits 85 and 86, from whence it is forced into annular conduit 105, then through conduit 109, orifice passages 110, orifice passages 121, transfer chamber 124, orifice passages 122, orifice passages 114, conduit 112, annular conduit 104, conduit 117, pipeline 23 to pressurize the L side of motor 22 and move piston 27 to the right and rudders 30, 31 to the left to turn the boat to the left.

Fluid from the R side of motor 22 flows through pipeline 24, conduit 115, annular conduit 103, conduit 111, orifice passages 113, orifice passages 120, conduit 125 to reservoir C.

Since the system is pressurized by means of a positive displacement pump, an excessively high pressure may be developed in the system which may exceed the bursting strength of the lines or cylinder. Therefore, a relief means is provided as shown in FIGURE 12.

The ends of the motor cylinder 22 are closed by means of screw caps 130, 131, which are threadedly attached to the cylinder 22, as at 132.

Each of the caps 130, 131 have longitudinally spaced radially extending bores 133, 134 and a longitudinally extending bore or bypass 135 placing the bores 133, 134 in communication with each other. When the caps 130, 131 are mounted on the cylinder 22, the bores 133, 134 register with apertures 136, 140 in the wall at each end of the cylinder 22.

The structure of the caps 130 and 131 are similar, but reversed to fit the respective ends of the cylinder 22, and therefore, the structure of the cap 130 will be described but the description will also apply to the cap 131.

The bore 133 is threaded to receive a fitting 138 to which the line 23 is attached. A stop collar 139 is slidably mounted on the shaft 28 to stop the movement of the piston 27 in the direction of the cap 130 and prevent closure of the aperture 136 so that hydraulic fluid may freely enter the cylinder 22 when the steering direction is changed. The collars 139 may be made of heavy neoprene tubing, for example, or other like plastic, or they may be made of metal. The plastic collars eliminate noise.

The bore 134 has a reduced diameter passageway 140 and provides a seat 141 to receive a ball relief valve 142. The bore 134 is closed at its outer end by an adjustment screw 143. A ball carrier 144 is seated on the ball 142 and a compression spring 145 is interposed between the ball carrier 144 and the adjustment screw 143 to bias the ball 142 against its seat 141. The ball carrier 144 is similar to the ball carrier 72 previously described.

The bore 134 is spaced from the bore 133 a distance equal to the longitudinal length or thickness of the piston 27, so that when the piston 27 is at the limit of its travel toward the end cap 130, the fluid on the opposite side of the piston 27 may pass through the aperture 140 when the pressure exceeds the bias of the spring 145.

Placing the relief valves in the end caps of the cylinder 22 is a convenient means for providing relief valves. It will be realized, of course, that a pair of relief valves may be installed at other points along the cylinder wall, or there may be one relief outlet in the wall with valved branches extending to each of the lines 23, 24. The purpose of the relief valve is to bypass fluid under excess pressure on one side of the piston to the line through which fluid from the opposite side of the piston is flowing back to the reservoir C. The relief valve will also prevent damage due to sudden water pressure against the rudder of the boat.

The bias of the springs 145 is such that it will hold the ball valve 142 on its seat under normal operating pressures, but if the pressure becomes so high that it might burst one of the lines 23 or 24, it overcomes the bias of spring 145 and unseats the ball and relieves the pressure in the cylinder 22.

Thus, if the operator of the boat has turned the steering wheel 40 in one direction until the piston 27 has been forced to its limit of travel adjacent the bore 136, for instance, and the operator continues to turn the steering wheel in the same direction, the relief valve 142 will operate to relieve the excess pressure caused by continuing to turn the wheel 40 after the piston 27 has reached its limit of travel.

While there has been disclosed in the foregoing description a practical embodiment of the vehicle steering mechanism in accordance with the present invention, it will be understood by those skilled in the art that variations in the implementation of the concept of the invention are within the purview and scope of the invention.

What is claimed is:

1. In a hydraulic vehicle steering mechanism having a housing, a shaft mounted in said housing, one end of said shaft extending outwardly from said housing, a steering wheel mounted on the extended end of said shaft, and a hydraulic cylinder having a double acting piston coupled with a steering linkage, the improvement comprising, in combination, a pump actuated by revolving said shaft and adapted to receive hydraulic fluid from a reservoir and force it unidirectionally to a collector conduit when said shaft is revolved in clockwise and counterclockwise directions, distribution valve means coupled with said shaft, conduit lines placing said pump in communication with each side of said piston, lost motion means between said distribution valve means and said shaft, and means coupled with said shaft for valving the fluid to one side of said double acting piston during rotation of the shaft in one direction and to the other side of the piston upon rotation of the shaft in the other direction, said valve means including means rotatable with said shaft to optionally open and close fluid communication between said conduit lines and said reservoir, thereby to lock and open said steering linkage.

2. In a hydraulic vehicle steering mechanism as claimed in claim 1, relief valves coupled with said hydraulic cylinder to relieve excess pressure on each side of said double acting piston and bypass means to couple each of said relief valves respectively with an opposite side of said hydraulic cylinder.

3. In a hydraulic vehicle steering mechanism having a housing, a shaft mounted in said housing, one end of said shaft extending outwardly from said housing, a steering wheel mounted on the extended end of said shaft, and a hydraulic cylinder having a double acting piston coupled with the steering linkage, the improvement comprising, in combination, a hydraulic pump, a reservoir for hydraulic fluid adjacent said pump, a collector conduit adjacent said pump, said pump having at least one cylinder, a pump piston mounted for reciprocation in said cylinder, cam means on said shaft for reciprocating said pump piston in said cylinder when said shaft is revolved in clockwise and counterclockwise directions, said pump being valved for pressure flow of the hydraulic fluid unidirectionally from said reservoir to said collector conduit, valve means coupled with said shaft for distributing said fluid under pressure to one side of said double acting piston and returning the fluid from the other side of said double acting piston to the reservoir when said shaft is revolved in one direction and distributing the fluid under pressure to the other side of said double acting piston and returning fluid from said one side of said piston when the shaft is revolved in the other direction, and said coupling between said valve means and said shaft providing relative movement therebetween so that said valve means is actuated before said pump means.

4. In a hydraulic vehicle steering mechanism having a housing, a shaft mounted in said housing, one end of said shaft extending outwardly from said housing, a steering wheel mounted on the extended end of said shaft, and a hydraulic cylinder having a double acting piston coupled with a steering linkage, the improvement comprising, in combination, a hydraulic pump, a reservoir for hydraulic fluid adjacent said pump, a collector conduit adjacent said pump, said pump having at least one cylinder, a pump piston mounted for reciprocation in said cylnder, cam means on said shaft for reciprocating said pump piston in said cylinder when said shaft is revolved in clockwise and counterclockwise directions, said pump being valved for pressure flow of the hydraulic fluid unidirectionally from said reservoir to said collector conduit, a valve having a barrel portion fixedly attached to said shaft, said valve having a sleeve portion mounted for relative movement on said shaft, said barrel portion having a plurality of ports, conduit means coupling said ports respectively with each end of said cylinder at each side of said double acting piston and with said collector conduit, said sleeve portion having a plurality of ports which may be brought into registry with said ports of said barrel portion by relative movement between said barrel portion and said sleeve portion to distribute fluid under pressure to one side of said double acting piston in said cylinder when said shaft is turned in one direction and to the other side of said double acting piston when the shaft is turned in the other direction and to conduct fluid from the non-pressurized side of said piston to the reservoir.

5. In a hydraulic vehicle steering mechanism as claimed in claim 4, a torque applicator fixedly coupled with said shaft, an ear portion extending outwardly from said torque applicator, said sleeve portion having a slot having radially extending sides to receive said ear portion of said torque applicator for relative movement therein, yieldable biasing means extending from each side of said ear portion to the sides of said slot to hold said ports of said sleeve portion out of registry with the ports of said barrel portion and said biasing means yielding to torque applied to said shaft in clockwise and counterclockwise directions.

6. The construction of claim 3 wherein said valve comprises an inner barrel portion and an outer portion, each having conduits therein, and a porting portion rotatable by said shaft to open and close fluid communication of said conduits with said reservoir, thereby optionally to lock and open said steering linkage.

7. In a hydraulic vehicle steering mechanism having a housing, a shaft mounted in said housing, one end of said shaft extending outwardly from said housing, a steering wheel mounted on the extended end of said shaft, and a hydraulic cylinder having a double acting piston coupled with a steering linkage, the improvement comprising, in combination, a pump actuated by revolving said shaft and adapted to receive hydraulic fluid from a reservoir and force it unidirectionally to a collector conduit when said shaft is revolved in clockwise and counterclockwise directions, a barrel fixed for rotation with said shaft, a plurality of internal conduits within said barrel at least one of which conduits being in fluid communication with said collector conduit, distribution valve means coupled with said shaft and selectively providing fluid communication between said internal conduits, lost motion means between said distribution valve means and said shaft such that upon initial and continuous movement of the shaft in one direction selected internal conduits are in fluid communication through said distribution valve, said distribution valve providing fluid communication only upon continuous movement of said shaft, conduit lines placing in fluid communication each side of said piston with other of said internal conduits.

References Cited in the file of this patent

UNITED STATES PATENTS

| | | |
|---|---|---|
| 738,767 | Brown | Sept. 15, 1903 |
| 1,047,600 | Williams | Dec. 17, 1912 |
| 2,850,878 | Sampietro | Sept. 9, 1958 |
| 2,922,440 | Hardy | Jan. 26, 1960 |